E. BROWN.
Lime-Extracting and Filtering Apparatus.
No. 151,469. Patented June 2, 1874.
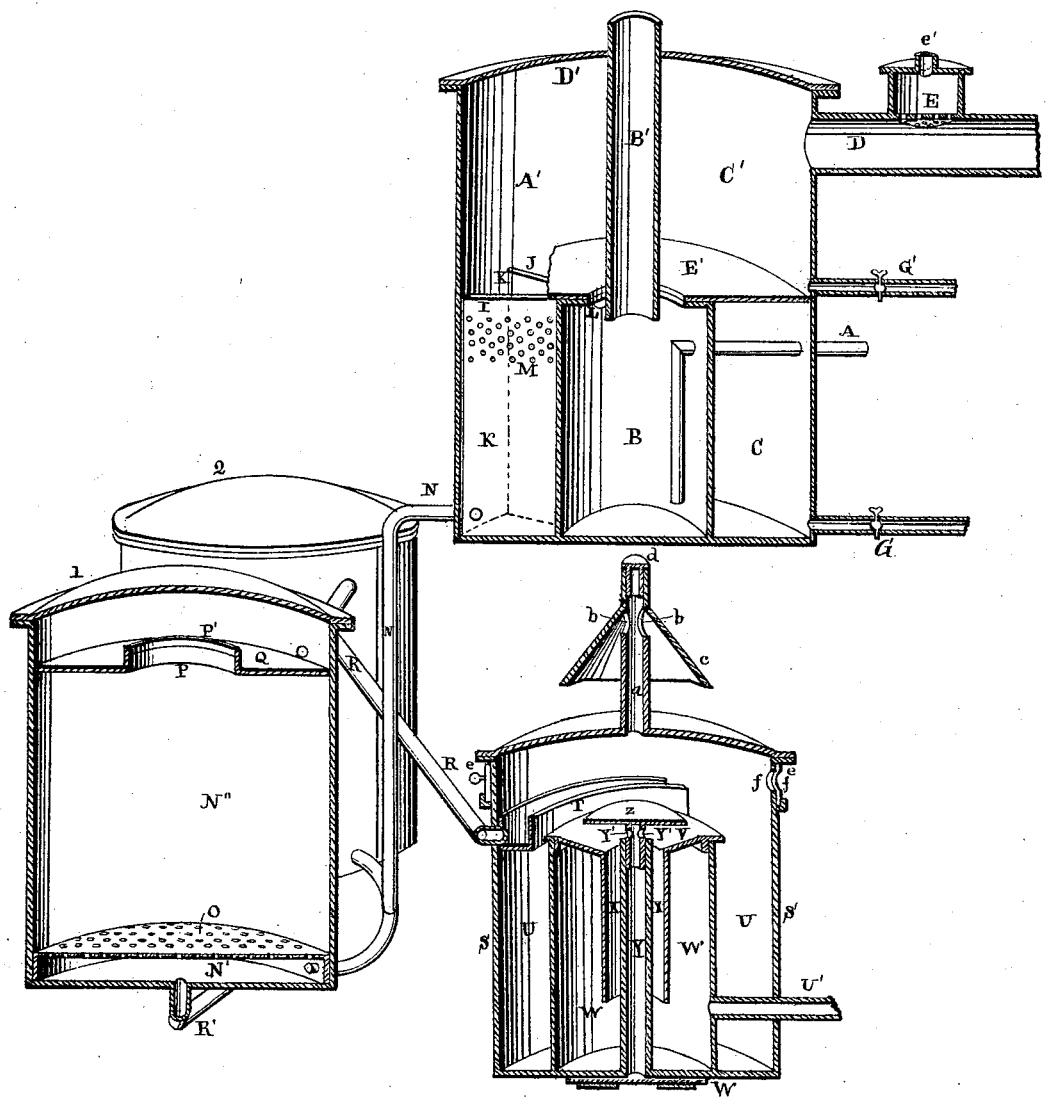
Witnesses,
A. McKinley
R. S. Shields
Inventor,
Edward Brown
by Job Abbott
attorney

UNITED STATES PATENT OFFICE.

EDWARD BROWN, OF ORRVILLE, OHIO.

IMPROVEMENT IN LIME-EXTRACTING AND FILTERING APPARATUS.

Specification forming part of Letters Patent No. 151,469, dated June 2, 1874; application filed January 3, 1874.

*To all whom it may concern:*

Be it known that I, EDWARD BROWN, of Orrville, in the county of Wayne and State of Ohio, have invented certain new and useful Improvements in Lime-Extracting and Filtering Apparatus; and that the following is a full, clear, and exact specification thereof, which will enable others skilled in the art to make and use the said invention.

My invention relates to an improved lime-extracting and filtering apparatus for removing lime and other impurities from water intended to be used in steam-boilers, in order to prevent the incrustation and fouling of the boiler; the main feature of said invention consisting in the peculiar construction of the water-heater, filters, vapor-condenser, and exhaust-condenser, and the manner of combining and operating the same, all of which will more fully appear from the following description of their construction and operation.

The accompanying drawing shows a sectional perspective view of my apparatus, the construction of which will be first detailed, and its combined operation then explained.

The water-heater consists of a large covered vessel, A', preferably of a circular form, in the interior of which is the water-chamber B, extending about half-way up the height of the vessel A', and having between it and the walls of the vessel A' an annular chamber, C, filled with hay, packed tightly, or other like material, out of which is formed a smaller chamber, K, by the radial partitions I J, the one, I, having a series of perforations, M, and the chambers B and C being connected by opening L.

The water from the water-tank is brought into the chamber B by a pipe, A, extending down nearly to the bottom of the chamber B; and the exhaust steam from the engine is brought into the same chamber B by the pipe B', extending down through the close cover D' of the vessel A', and through a large opening in the cover E', which covers the chambers C and K. A pipe, D, leads from the chamber C' into the water-tank, above the water-level therein, said tank being closed at the top, and provided with a pipe for the escape of any uncondensed steam. In the upper side of the pipe D is inserted the exhaust-condenser E, having the form of a "rose-head" for hose, into which the cold water, from whatever source of supply, is led by the pipe e', and, running through perforations in the head E, passes through the pipe D to the water-tank. A pipe, G, with stop-cock, affords means of drawing the water from chamber C when the material therein is to be removed and replaced; and another pipe, G', with stop-cock, prevents the flooding of chamber C' in case the water, from any cause, should rise from the chamber B over the cover E'.

The filters 1 2, of which there may be one or more, are preferably made of circular form, and have a false bottom, N', with perforations O, on which is packed pressed hay, charcoal, gravel, or other filtering material, which fills the space N'', and is pressed down by a diaphragm, Q, made to fit tightly against the walls of the filter by packing or other means, and having a raised ring, P, at its center, covered by a screen, P', of fine wire, muslin, or other straining material.

Pipes N conduct the water from the lower part of chamber K into the filter 1, below the bottom N', and other pipes R take the water from above the cover Q to the vapor-condenser, while the pipe R', which is provided with stop-cock, affords means of draining the filter, when desired, for repacking or other purposes.

The vapor-condenser consists of a circular vessel, S, in the interior of which is the circular partition W, having a cover, V, down from the central hole in which extends a pipe, X. The pipe Y rises from the bottom of vessel S, up through the pipe X, and is surmounted by the cap Z, arranged on a tube which slides into the tube Y, and is provided with perforations Y'. From the cover of vessel S rises a tube, a, having perforations b b, and a downward-deflecting cap, c, the end of said tube being closed by a plug, d, which can be readily removed, if desired.

A slide, w, regulates the admission of air to the pipe Y; and the circular slide e regulates the admission of air into openings f in the vessel S. A semi-annular trough, T, receives the water from pipe R, and pours it into each side of the chamber U, and a pipe, U', takes the water from the chamber W to the hot-water pump, by which it is forced into the boiler.

The operation of my apparatus is as follows: The water-chamber B is filled with water, through the pipe A, up to the level of the hole L, through which the water passes through the packing in chamber C, around through the perforations M in partition I into the chamber K. The exhaust steam from the engine, being introduced in chamber B through pipe B', heats the water in said chamber, and is partially condensed by said water. The uncondensed portion of steam rises into the chamber C' and passes through pipe D, in which it is nearly or wholly condensed by the jets of water from exhaust-condenser E, thereby passing the water in a more or less heated state into the water-tank, whence it is brought by pipe A into chamber B, where it is further heated by the exhaust steam from pipe B, and, passing in this heated state through the fibrous packing in chamber C, most of the lime and other impurities are deposited in said packing. The water from chamber K passes through pipe N into the filters 1 2, and, rising through perforations O in false bottom N', passes through the filtering material in chamber N'', by which any impurities held in suspension in the water are removed. The diaphragm Q being tightly fitted in vessel I the water is compelled to rise through the screen P', which retains any particles of the filtering material, and from thence passes through pipe R to the vapor-condenser. The water, during all this purifying process, being in a heated state, passes from the pipe R with more or less vapor, and were it to be conveyed by said pipe directly to the hot-water pump to be forced into boiler, the vapor would act to retard the action of the pump in the same manner as air in the water impedes the action of the ordinary cold-water pump, to obviate which difficulty is the purpose of the vapor-condenser. The water flows from pipe R through the trough T into chamber U, and rising in said chamber flows over the cover V, down the pipe X, into the interior chamber W, whence it is taken by pipe U' to the hot-water pump to be forced into the boiler. The valve $w$ having opened, a current of air rises through pipe Y and passes through holes Y', between the cover V and cap Z, where it condenses the vapor rising from the water flowing over said cover without materially lowering the temperature of the water. The air and any uncondensed vapor pass out through the holes $b$ in pipe $a$, and in case more air is required to condense the vapor from the water in chamber U, it is obtained by moving the slide $e$ to open the holes $f$, in a manner readily seen.

I have here described all the parts of my apparatus, as acting together, which will ordinarily be required to produce the best results, but cases may occur in which parts of my apparatus may be dispensed with—as, for example, in very clear water, impregnated with lime, the filters 1 2 could be omitted, and the pipes N and R united to allow the water to pass directly from the water-heater to the vapor-condenser. The size and number of filters 1 2 required is a matter of judgment for the operator, but should be such as will allow the water to pass through slowly and without being forced, as the rapid passage of water through the filters prevents their efficient action.

Having thus fully described my apparatus, what I claim therein as new and of my invention, is—

1. The outer vessel A', containing water-chamber B, surrounding chamber C, filled with fibrous packing material and receiving chamber K, the several parts being arranged and operating substantially as specified.

2. The exhaust-condenser E, of the form shown, in combination with the cold-water pipe $e'$, and the pipe $d$ for conducting the exhaust steam to the water-tank, substantially as and for the purpose specified.

3. The vessel 1 with false perforated bottom N, chamber N'' filled with filtering material, and close-fitting diaphragm Q with raised ring P, with screen P' thereon, the several parts being arranged and operating substantially as for the purpose specified.

4. The vessel S with water-trough T, central water-chamber W with cover V, central air-tube Y with deflector Z, and escape-tube $a$, these several parts being arranged and operated substantially as and for the purpose herein specified.

As evidence of the foregoing, witness my hand this 25th day of November, A. D. 1873.

EDWARD BROWN.

Witnesses:
M. C. ROUCH,
E. E. BOWMAN.